United States Patent
Hadzimahalis

[11] 3,797,909
[45] Mar. 19, 1974

[54] DIRECT READING TRIANGULATION FOCUSING MECHANISM

[75] Inventor: Theodore M. Hadzimahalis, Libertyville, Ill.

[73] Assignee: Bell & Howell Company, Chicago, Ill.

[22] Filed: Sept. 5, 1972

[21] Appl. No.: 286,362

[52] U.S. Cl. .................................. 95/44 R, 350/46
[51] Int. Cl. ............................................. G03b 3/00
[58] Field of Search ............ 95/44 R, 44 C; 350/46

[56] References Cited
UNITED STATES PATENTS
3,563,151   2/1971   Koeber............................. 95/44 R

*Primary Examiner*—Samuel S. Matthews
*Assistant Examiner*—Richard A. Wintercorn
*Attorney, Agent, or Firm*—Roger M. Fitz-Gerald; John E. Peele, Jr.

[57] ABSTRACT

An improvement in a distance determining mechanism for a camera having a focusable objective lens, the mechanism including a pendulous member having a cam surface formed with fine pitched teeth with which similar teeth on a cam follower cooperate to cause adjustment of the lens to a focus condition and, after adjustment, to cause substantially positive locking of the lens in adjusted position while enabling manual focusing through actuation of an externally extending focusing control. By the improvement, the mechanism permits more positive movement of an indicator relative to a focusing scale responsive to the focus condition of the objective lens which is positioned responsive to orientation of the pendulous member of the focusing mechanism.

7 Claims, 3 Drawing Figures

PATENTED MAR 19 1974  3,797,909
Fig. 1.
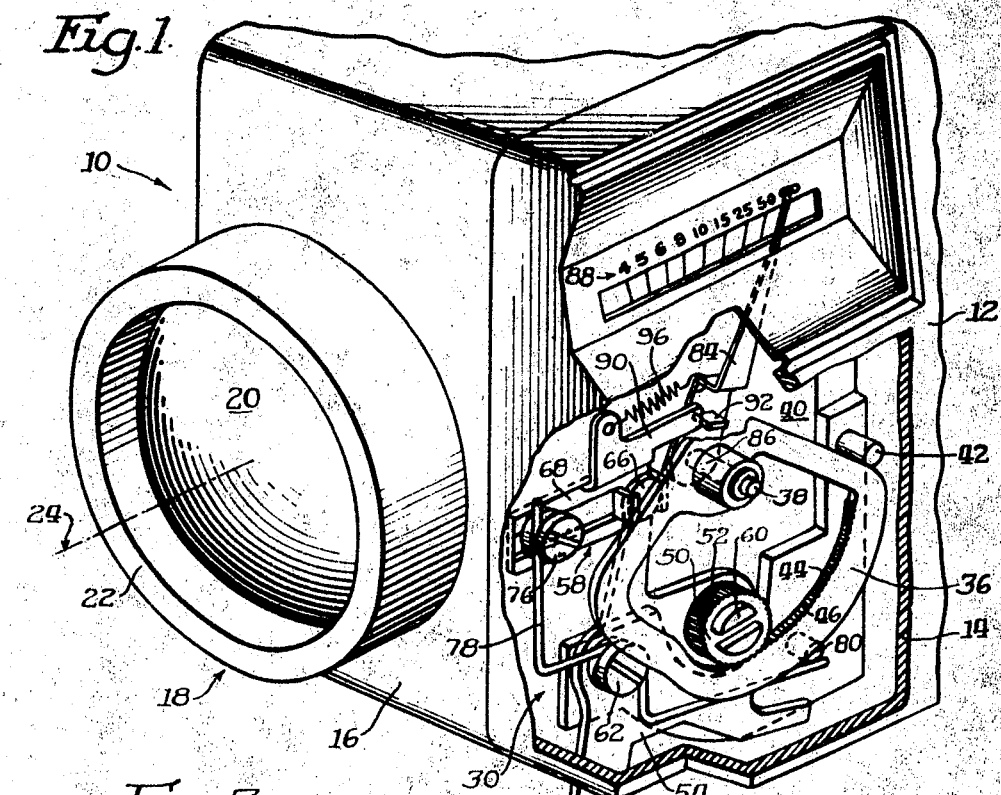
Fig. 3.
Fig. 2.
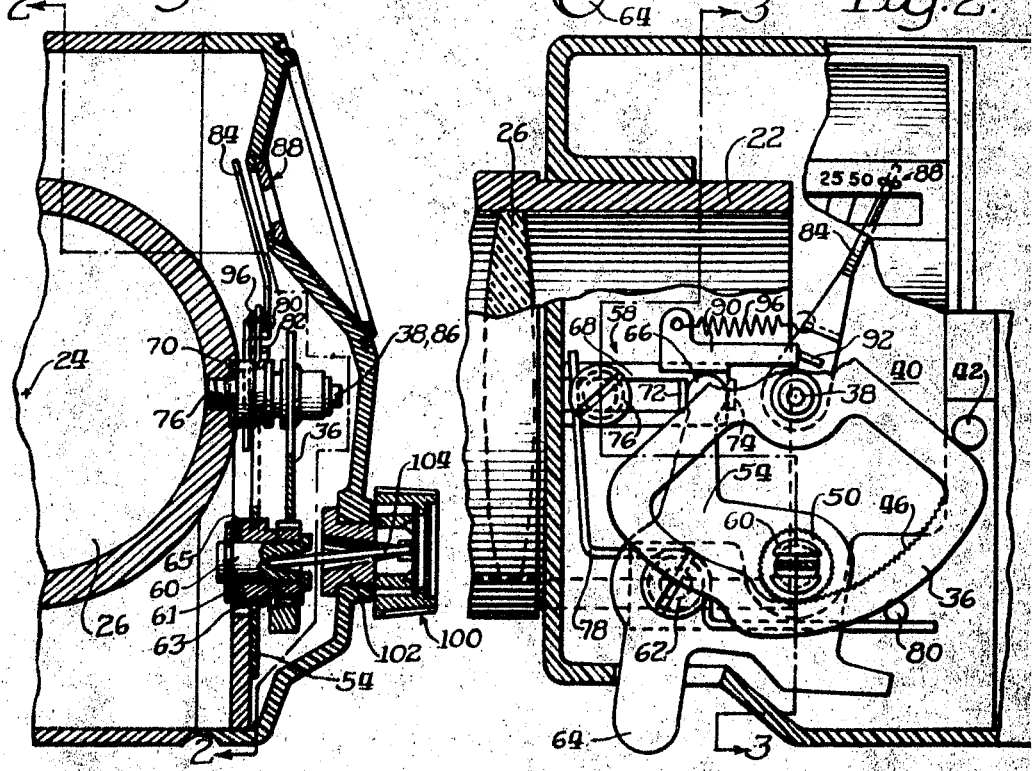

DIRECT READING TRIANGULATION FOCUSING MECHANISM

The present invention relates to an improvement in a distance determining mechanism for an optical instrument having an objective lens which is adjustable according to focal distances, which distances are determinable by the mechanism in the form of a pendulous rangefinder functioning on the principle of triangulation. Particularly, the invention relates to a coupling device providing for adjustment of an indicator relative to a distance scale upon focusing adjustment of the objective lens to provide for a more accurate indication of the focus condition of the lens after a focusing operation.

The triangulation principle relates to the computation of the length of one side of a right triangle, herein the camera-to-subject distance. To compute the distance, the height of either the vertical side or the length of the hypotenuse of the triangle, and one of the angles other than the right angle must be known. For use of the principle in a camera focusing arrangement, the length of the vertical side of the triangle may be empirically determined as the "height of an average adult" above the supporting plane on which the user stands. Thus, the vertical side will be approximately the same in most uses to which a camera is put. By having the user align the base of a remote subject with a reference mark in the viewfinder the of the camera, the camera is caused to be angled by determinable amounts. That is, the user views the subject at the point where a vertical line through the subject intersects the supporting plane. Hence, when the optical axis of the camera's lens is angled at a given angle relative to both the vertical side and the base side of the triangle, the required values necessary to compute the unknown length of the base line are available.

The present invention belongs to a series of devices which seek to eliminate the need for mathematical computation by the user by providing a mechanism which functions to focus the lens on a semiautomatic basis. A device of similar construction is described in a co-pending application "LENS FOCUSING MECHANISM WITH MANUAL CONTROL" by H. J. Koeber, Ser. No. 147,943, and assigned to the same assignee. To determine the angle of inclination of the optical axis, a pendulous member orientable under the influence of gravity is arranged to pivot about an axis which extends perpendicularly of the optical axis. When the user sights the base of a subject at infinity, the optical axis remains horizontal with a base line on which both the subject and the user are effectively supported. Hence, the pendulous member remains vertical and therefore perpendicular to the horizontally oriented optical axis. However, if the user sights the base of a near subject, the optical axis and camera housing will be inclined relative to the horizontal base line. As the housing is inclined, the pendulous member will hang vertically under the influence of gravity. In this orientation, the pendulous member is displaced from the optical axis by a given angle. Since the range of angular displacements corresponding to the range of focus planes of the lens can be determined, these values may be built into a focusing mechanism to adjust the focus of the lens for that given distance.

In prior triangulation focusing systems having pendulous members, the distance indicator has been adjusted relative to the distance scale in response to orientation of the pendulous member. However, because of tolerances introduced in manufacture, the pendulous member may not agree with the focus condition of the lens sufficiently to permit the user to manually adjust the lens to a precise focus condition. That is, the tolerance build-up between reference surfaces of the lens, the pendulous member, and the scale indicator member may enable the scale and the lens to be at sifnificantly different camera-to-subject distances. At substantial distances, the error introduced is insignificant while at short distances, the same error factor is undesirable. Since assembly and adjustment to the desired fine focus condition indication increases the cost of the instrument due to the several parts of the focus determing mechanism and of the instrument, a direct reading system whereby the lens focus condition is positively related to the scale indicator is desirable.

An object of the present invention is to provide a mechanism for indicating more precisely the condition to which the objective lens is focused by an objective lens focusing mechanism having either semiautomatic or manual capabilities for focusing of the objective lens.

Another object of the invention is to provide a novel coupling mechanism to translate the position of a pendulous member and the focused condition of a lens to an indicated position of the focus scale.

Further and other objects will be apparent from the description of the accompanied drawings in which like numerals refer to like parts.

In the drawings:

FIG. 1 is a partial perspective view of an optical instrument incorporating the distance determining mechanism of the present invention, with parts broken away from clarity;

FIG. 2 is an elevational view of the mechanism of the invention taken along line 2—2 of FIG. 3; and FIG. 3 is a sectional view of the mechanism taken along line 3—3 of FIG. 2.

Referri_g now to the drawings, there is shown a portion of a camera 10 with a housing 12 having conventional wall portions including a side wall portion 14 and a front wall portion 16 from which an objective lens assembly 18 extends. This objective lens assembly includes an objective lens 20 positioned substantially concentrically of a lens barrel 22 and defining an optical axis 24. A lens focusing element or cell 26 (shown in FIG. 3) is supported movably in barrel 22 so that the cell moves axially of optical axis 24 to focus an image of a remote subject on a not shown film plane internal of the camera housing. That is, when "in-focus," the image of a remote subject is focused on a focal plane coincident with the film plane. A change of either the distance between the camera and the subject or of the focal plane at which the objective is focused relative to the film plane causes the image to be focused on other than the film plane. Thus, the objective lens must be capable of being focused for a range of camera-to-subject distances.

On side wall 14 of camera housing 12, a focusing mechanism 30 is mounted and arranged to cooperate with objective lens assembly 18 to enable semiautomatic adjustment of the focus of objective lens 20. The mechanism includes a pendulous member 36, releasably mounted for free swinging movement about an axle 38, which axle is supported on a mechanism support plate 40 attached within the camera housing.

When the pendulous member is in free swinging condition, it seeks a gravity oriented position responsive to the inclined orientation of the camera's optical axis 24 which defines the hypotenuse of a right triangle. The vertical line of the triangle is understood to extend vertically from the camera to intersect the base line extending horizontally from the base of the subject along a supporting plane on which the subject and instrument user are effectively located.

To enable the pendulous member 36 of the focusing mechanism 30 to translate the angular orientation of the optical axis into a distance determination, an edge 44 of the pendulous member is configured with a cam formation. As the pendulous member moves relative to a given position, radial differences of the cam surface relative to the axle 38 about which the pendulous member swings provides for distance translation. One extent of the angle through which the member swings is predetermined by a fixed stop 42 which provides a reference for the infinity position of the member and of cam edge 44. The changing radii of the cam permits the adjustment of focus to finite distances from the minimum extent to which the lens may be focused.

Formed along the cam edge 44 of the pendulous member is a surface having a series of fine pitched teeth 46, for cooperation with a pinion 50 having a surface which includes teeth 52 of a similar pitch. The teeth of the pinion and the pendulous member are engageable with one another to provide positive cooperative adjustment rather than relative or sliding movement between the components.

As a portion of a control mechanism, a translator plate 54 cooperates with both the cam edge 44 of the pendulous member 36 and a lens adjusting mechanism 58 to translate the position of the pendulous member into an "in-focus" condition of the objective lens 20. The translator plate 54 supports a stub axle 60 on which the pinion 50 is rotatably carried. The translator plate 54 is mounted for pivotable movement about an axle pin 62 extending from mechanism plate 40. A lug portion 64 of the translator plate extends externally of the housing to be manually displaced to physically pivot the plate 54 and the pinion 50 thereon.

About the end of the stub axle 60 which supports the pinion 50, and on the end opposite the pinion is fixed a retainer ring 61. Between the retainer ring and a bushing 63 which surrounds the axle 60 behind the pinion is a yieldable friction washer 65. The washer urges the stub axle a restrained condition to prevent unwanted rotation of the pinion 50.

In the focusing condition, a bearing portion 66 of the translator plate 54 cooperates with the lens adjusting mechanism 58 comprising a slide 68 carried in a recess 70 in the lens barrel 22 of the objective lens 20. The adjustable slide 68, attached to the focusing lens cell 26 of the objective lens, includes a pair of spaced lugs 72, 74 between which the bearing 66 of the actuator plate 54 is received. A combination abutment portion and threaded member 76, fixed to slide 68, attaches the slide to the movable focusing cell, and is engaged by an end of a biasing member, shown as spring 78. The opposite end of spring 78 engages a limit pin 80 extending from the mechanism support plate 40.

In this preferred embodiment, the bearing portion 66 of the translator plate 54 moves the slide 68 axially of the lens to displace the focusing cell 26 of the lens to a focus position. Upon actuation of the translator plate to disengage the pinion 50 from the pendulous member 36, the translator plate moves the bearing 66 and the slide against the urging of the spring 78, wherein the focusing cell is displaced toward one extent of the focusing range of the objective lens. Upon release of the translator plate, the spring urges the slide and the focusing cell 26 in the opposite direction toward the other extent of the focusing range. The extent of displacement toward this latter position is determined by the amount of movement of pinion 50 before engagement with the cam surface 44 of the pendulous member.

To translate the focus condition of the objective lens into a user discernible indication, a distance reference indicator 84 is supported for pivoting movement about a pivot axis 86, which axis may be coaxial with the pendulous member supporting axis 38. The indicator 84 is designed for adjustment relative to a reference scale 88 which is shown visible externally of the camera side wall, but may also be visible in the viewfinder (not shown) of the camera. An extension 90 or indicator pusher is formed integrally with and is an end of the slide 68 adjacent the indicator 84. The extension 90 is arranged to engage a tab 92 formed on the indicator member. The components form a coupling to maintain continued engagement between the reference surfaces of the indicator and of the slide. A biasing member 96, shown as a tension spring connecting the slide and the indicator, couples the components by urging one toward the other. Hence, as the focusing cell and the slide are adjusted in response to positioning of the pendulous member, the indicator is positively positioned. That is, the position of the indicator is made responsive to the position of the focusing cell through as positive a manner as possible rather than responsive to the pendulous member. Therefore, the lens focus condition is indicated instead of the orientation of the pendulous member as is the usual arrangement when the indicator is fixed to the pendulous member.

As seen best in FIG. 3, a portion of the control mechanism is a manual control knob 100 external of the camera housing. The knob is supported on a sleeve bearing 102 carried in the side wall of the camera housing. Extending from the knob through the sleeve bearing is a key member 104 which couples the knob to the pinion 50. By the key, manual rotational drive of the knob is transmitted to the pinion.

For semiautomatic operation of the focusing mechanism 30, the manually engageable release member or tab 64 is operated to pivot translator plate 54 about axis 62. Simultaneously with the pivoting action, the lens adjusting mechanism causes displacement of the focusing cell 26 of the objective lens 20 to its minimum focus condition. Pivoting of the translator plate 54 raises pinion 50 from the gear teeth 46 of pendulous member 36 to permit the now free pendulous member to rotate about axle 38 under the influence of gravity. As the pendulous member is oriented, the increasing cam rise of the edge 44 is adjusted relative to the position of pinion 50 so as to be engaged upon release of the release member 64. As the pinion 50 returns into engagement or mesh with the teeth on cam surface 44, the pendulous member is locked in the adjusted position. Simultaneously as the translator plate pivots for reengagement of the pinion, the bearing 66 moves the slide 68 to focus the objective lens and to adjust the indicator 84 relative to scale 88. The camera can now be used until additional focusing is desired at which time the above sequence of semiautomatic focusing operation or a manual focusing operation is performed.

For a manual focusing operation, the manual control knob 100 is rotated to effectively drive the pendulous member 36 and therefore to cause the indicator or distance reference member 84 to move relative to the scale 88. Because the penculous member is provided with teeth cooperating with pinion 50, the cam edge of the pendulous member causes adjustment of the translator plate 54 about pivot 62. In turn, the bearing 66 of the translator plate adjusts slide 68 and the focusing cell 26 of the objective lens 20, as well as the position of indicator 84 relative to the distance scale 88.

It is understood that the embodiment shown is illustrative of the principle of operation of an improved distance indicator mechanism for use with a focusing mechanism which employs a pendulous rangefinder to adjust the orientation of a focusable lens in a camera, and that certain changes and alterations can be made in the structure of the distance indicating mechanism without departing from the spirit of the invention.

What is claimed is:

1. Improvements in a range determining device using the principle of triangulation adapted for use in an optical instrument having a focusable objective lens and a housing adapted for orientation about a predetermined axis to orient the optical axis to an angle defining the hypotenuse of a triangle, the device including a pendulous member being supported in said housing to be oriented for focusing of said objective lens, and having a cam surface corresponding to the angle of inclination of said optical axis, the improvement comprising:
   a distance reference scale means;
   an indicator means adjustable responsive to the focus condition of the focusable objective lens and adjustable independently of adjustment of the pendulous member.

2. A combination as in claim 1 comprising means coupling said indicator means and said objective lens for orientation of said indicator means responsive to the focus condition of said objective lens.

3. A combination as in claim 2 wherein said coupling means includes means engaging said indicator means and means biasing said indicator means relative to said engaging means.

4. A combination as in claim 3 wherein said biasing means is a tension spring urging said indicator means against said engaging means.

5. Improvements in a range determining device using the principle of triangulation adapted for use in an optical instrument having a focusable objective lens and a housing adapted for orientation about a predetermined axis to orient the optical axis to an angle defining the hypotenuse of a triangle, the device including a pendulous member being supported in said housing to be oriented for focusing of said objective lens, and having a cam surface corresponding to the angle of inclination of said optical axis, the improvement comprising:
   a distance reference scale means;
   an indicator means arranged for movement relative to said scale means;
   means displaceable positively by said objective lens cooperating with said indicator means for displacing said indicator means upon adjustment of said objective lens through a focusing range normally corresponding to the orientation of said pendulous member.

6. Improvements in a range determining device using the principle of triangulation adapted for use in an optical instrument having a focusable objective lens and a housing adapted for orientation about a predetermined axis to orient the optical axis to an angle defining hypotenuse of a triangle, the device comprising:
   a pendulous member being supported in said housing to be oriented responsive to the angle of inclination of said optical axis;
   means cooperating with said pendulous member for displacing said objective lens into focus orientation responsive to the oriented position of said pendulous member;
   a distance reference scale means;
   an indicator means independent of said pendulous member and said objective lens being movable relative to said reference scale means; and
   means coupling said indicator means to said objective lens for adjustment of said indicator means reponsive to the position of said objective lens when said lens is adjusted in responsive to orientation of said pendulous member.

7. A combination as in claim 6 wherein said coupling means includes means engaging said indicator means, means biasing said indicator means relative to said engaging means, and means coupled to a focusing lens component for adjusting said engaging means responsive to the positive of said focusing lens component.

* * * * *